United States Patent Office 3,267,124
Patented August 16, 1966

3,267,124
BENZYLESTER OF DI-(1-METHYLHEPTYL) THIOCARBAMIC ACID
Richard A. Nyquist, Midland, Mich., assignor to The Dow Chemical Company, Midland, Mich., a corporation of Delaware
No Drawing. Filed Oct. 17, 1963, Ser. No. 317,075
1 Claim. (Cl. 260—455)

The present invention is concerned with the S-benzyl ester of di-(1-methylheptyl)thiocarbamic acid. The present compound is of the formula

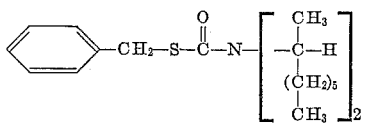

The compound is an amber liquid, when of 90 to 95 percent purity, is of very limited solubility in water and relatively soluble in various organic solvents such as acetone. The compound is useful for the kill of intestinal parasites in warm-blooded animals, but is of very low toxicity to the warm-blooded animals themselves; the compound is useful for the control of soil-dwelling plant-damaging nematodes, and is useful as an intermediate reactant in the preparation of derivative compounds of high biological activity.

The compound of the present invention is readily prepared by reaction between bis(1-methylheptyl)amine and the S-benzyl ester of chlorothioformic acid. This reaction is represented by the equation

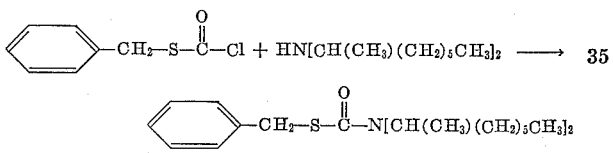

The reaction goes forward to advantage in the presence of an inert liquid reaction medium which may be carbon tetrachloride. The reaction liberates hydrogen chloride of reaction which can be taken up by the employment, as hydrogen chloride acceptor, of an additional portion of the bis(1-methylheptyl)amine. The reaction is exothermic and goes forward rapidly. Upon completion of the reaction, the resulting reaction mixture can be washed with water whereby to remove uncombined starting materials, with only nominal loss of product. Liquid reaction medium can be removed by vaporization. However, when desired, by using only proportions of reactants that are consumed, the resulting reaction mixture can be employed without further purification by vaporization and removal of solvent.

The following example illustrates the present invention.

5 grams of the S-benzyl ester of thiocarbonyl chloride was dropped slowly, portionwise, with continuous stirring and with all reactants initially at room temperature, into a dispersion of 12.96 grams bis(1-methylheptyl)amine in 150 milliliters carbon tetrachloride. Upon completion of the addition of the reactants, the resulting reaction mixture was stirred mechanically over a period of approximately 4 hours. At the conclusion of this period of time, the resulting mixture was washed repeatedly with separate portions of water in a separatory funnel, the wash water discarded, the organic layer then transferred to an evaporating dish placed over a steam bath. The carbon tetrachloride liquid reaction medium was removed by vaporization, and the resulting S-benzyl ester of di-(1-methylheptyl)thiocarbamic acid obtained as an amber liquid. The infrared spectrum confirmed the assigned structure.

When employed as an internal medicament for the control of tapeworms in mice, by admixture in food available to the mice ad libitum in a concentration of 0.12 percent by weight of food, a group of mice fed on the food thus medicated, all of which were infested with mouse tapeworm, were rendered completely free thereof.

I claim:
The benzyl ester of di-(1-methylheptyl)thiocarbamic acid, of the formula

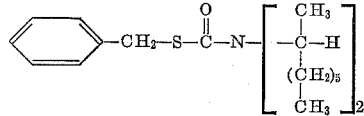

References Cited by the Examiner
UNITED STATES PATENTS
3,151,119   9/1964   Grisley et al. _____ 260—455

CHARLES B. PARKER, Primary Examiner.
DALE R. MAHANAND, Assistant Examiner.